(12) United States Patent
Denham (10) Patent No.: US 10,510,001 B2
(45) Date of Patent: Dec. 17, 2019

(54) NEUROMORPHIC TRAINING ALGORITHM FOR A RESTRICTED BOLTZMANN MACHINE

(71) Applicant: Michael James Denham, Ipswich (GB)

(72) Inventor: Michael James Denham, Ipswich (GB)

(73) Assignee: Mindtrace Limited, Salford (GB)

( * ) Notice: Subject to any disclaimer, the term of this patent is extended or adjusted under 35 U.S.C. 154(b) by 220 days.

(21) Appl. No.: 15/462,062

(22) Filed: Mar. 17, 2017

(65) Prior Publication Data

US 2017/0270410 A1    Sep. 21, 2017

Related U.S. Application Data

(60) Provisional application No. 62/310,189, filed on Mar. 18, 2016.

(51) Int. Cl.
*G06N 3/08* (2006.01)
*G06N 3/04* (2006.01)
*G06N 3/063* (2006.01)

(52) U.S. Cl.
CPC ............ *G06N 3/08* (2013.01); *G06N 3/0472* (2013.01); *G06N 3/049* (2013.01); *G06N 3/063* (2013.01)

(58) Field of Classification Search
None
See application file for complete search history.

(56) References Cited

U.S. PATENT DOCUMENTS

| | | | |
|---|---|---|---|
| 2012/0303615 A1* | 11/2012 | Goswami | G06Q 30/02 707/723 |
| 2016/0070673 A1* | 3/2016 | Wang | G06F 17/141 708/403 |
| 2016/0260428 A1* | 9/2016 | Matsuda | G06N 3/08 |
| 2016/0275397 A1* | 9/2016 | Neil | G06N 3/0472 |
| 2017/0091617 A1* | 3/2017 | Baughman | G06N 3/0445 |
| 2018/0046902 A1* | 2/2018 | Liao | G06N 3/088 |

* cited by examiner

*Primary Examiner* — Kaveh Abrishamkar
(74) *Attorney, Agent, or Firm* — Sterne, Kessler, Goldstein & Fox P.L.L.C.

(57) ABSTRACT

This invention solves the long-standing problem in Machine Learning of training a neural network on a spike-based neuromorphic computer. The preferred embodiment of the invention describes an algorithm for training a Restricted Boltzmann Machine (RBM) neural network, but the invention applies equally to training neural networks in the general class of Markov Random Fields. The standard CD algorithm for training an RBM on a general-purpose computer is unsuitable for implementation on a neuromorphic computer, as it requires the communication of real-valued parameter values between neurons, and/or shared memory access by neurons to stored parameter values. By employing the invention described, these requirements are eliminated, thus providing a training algorithm which can be implemented efficiently on a spike-based, distributed processor and memory, neuromorphic computer system.

9 Claims, 8 Drawing Sheets

NEUROMORPHIC TRAINING ALGORITHM FOR A RESTRICTED BOLTZMANN MACHINE

CROSS REFERENCES TO RELATED APPLICATIONS

This application claims the benefit of the Applicants' prior provisional application, No. 62/310,189, filed on Mar. 18, 2016.

FIELD OF INVENTION

The invention relates to the general technological fields of Artificial Intelligence and Machine Learning, and in particular to training algorithms for Artificial Neural Networks. It has a specific application as a training algorithm for the type of neural networks known as Restricted Boltzmann Machines, but has wider application to those neural networks which fall in the more general class of Markov Random Fields.

BACKGROUND

Machine Learning is an important area of Artificial Intelligence, A major area of Machine Learning involves the use of data to train a neural network, and algorithms for training neural networks have found numerous highly successful practical applications, e.g. in visual recognition, speech recognition, natural language processing and text mining. Algorithms for training neural networks are run either on general-purpose computers or on specialist computing hardware, such as Graphics Processor Units. Neuromorphic computers are a recently developed class of specialist computers with the following properties: (a) they use multiple computing units (cores) connected by a communication network, (b) there is no global memory storage and the only available memory is distributed between, and local, to the cores or to a node containing a group of cores; (c) communication between cores is carried out by the transfer of a special type of message, known as a "spike", a message which indicates the occurrence of an event in the sending core; (d) processing on a core is activated asynchronously in an interrupt-driven manner, triggered principally by the receipt of a spike message at the core. Such a neuromorphic computer is exemplified by the SpiNNaker machine [1].

The invention described herein solves a long-standing problem of training a neural network on such a neuromorphic computer. The specific type of neural network addressed in the preferred embodiment of the invention is known as a Restricted Boltzmann Machine (RBM). The standard algorithm for training an RBM on a general-purpose computer is the Contrastive Divergence (CD) algorithm [2]. However, this algorithm is unsuitable in its standard form for training an RBM on a neuromorphic computer, as it requires the transfer of real-valued learnt parameter values between cores, or their storage in and retrieval from global memory, i.e. which is accessible to all the cores.

By employing the invention described herein, there is no requirement for the communication of parameter values between neurons, or for the accumulation and retrieval of stored changes to these parameter values using shared memory, thus providing a training algorithm which can be implemented efficiently on a neuromorphic computer system.

SUMMARY

The invention specifically describes a algorithm for training a Restricted Boltzmann Machine (RBM) neural network on a neuromorphic computer. The algorithm has the following properties: (a) it uses parallel distributed processing on the computer's multiple cores; (b) it only requires access to the distributed memory components which are local to a single core or a group of cores (node); and (c) it uses only messages between cores which consist of "spikes". The algorithm computes changes to the parameters (weights and biases) of any given neuron in the network locally within the processing core to which the neuron is assigned, and retrieves and stores the neuron's parameters before and after computing the changes, using only the memory local to that core or to its associated node.

These properties are essential to the implementation of any training algorithm for a neural network on a neuromorphic computing system, that is, a computing system which is characterised by: a large number of processor cores; a fully distributed memory system; asynchronous, event-based operation; a highly efficient, low latency communication network linking the processor cores which is based on the transmission of spike messages.

The claims of the invention relate to those properties of the training algorithm described above, which allow its implementation on a neuromorphic computing system. The exemplary embodiment of the invention relates to the training of a specific type of neural network: a Restricted Boltzmann Machine. However, alternative embodiments allow the invention to be applied to the training of other neural networks which fall into the class of Markov Random Fields.

BRIEF DESCRIPTION OF THE DRAWINGS

An exemplary embodiment of the invention is disclosed in the following detailed description and accompanying drawings

FIG. 4 (a)-(e) illustrates each step in the preferred embodiment of the training algorithm.

DETAILED DESCRIPTION AND PREFERRED EMBODIMENT

The following is a detailed description of an exemplary embodiment to illustrate the principles of the invention. The embodiment is provided to illustrate aspects of the invention, but the invention is not limited to any embodiment. The scope of the invention encompasses numerous alternatives, modifications and equivalent, it is limited only by the claims.

Numerous specific details are set forth in the following description in order to provide a thorough understanding of the invention. However, the invention may be practiced according to the claims without some or all of these specific details. For the purpose of clarity, technical material that is known in the technical fields related to the invention has not been described in detail so that the invention is not unnecessarily obscured.

1. The Restricted Boltzmann Machine Neural Network

Figure 1:
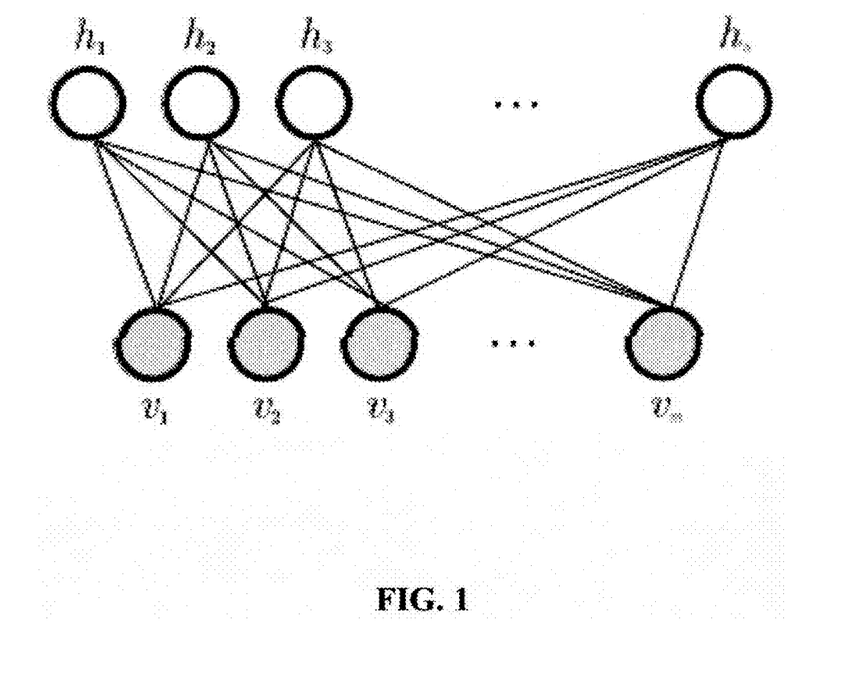
FIG. 1 illustrates the architecture of the Restricted Boltzmann Machine neural network.

The Restricted Boltzmann Machine (RBM) neural network is illustrated in FIG. 1. It consists of two layers of neurons: a layer of hidden neurons $h_1, \ldots, h_m$; and a layer of visible neurons $v_1, \ldots, v_n$, where the number of hidden neurons, m, and the number of visible neurons, in, are arbitrary. The two layers are fully connected by bidirectional links, but there are no connections between neurons within each layer. Each bidirectional link is assigned a real-valued weight parameter, and each neuron is assigned a real-valued bias parameter.

In the following, the same symbol, e.g. $h_i$, is used to denote both the neuron itself, and the value of its state. The same is true for the corresponding vectors:

$$v = \begin{bmatrix} v_1 \\ \vdots \\ v_n \end{bmatrix}, h = \begin{bmatrix} h_1 \\ \vdots \\ h_m \end{bmatrix}$$

In the description of this embodiment, the state of each of the neurons is binary-valued, i.e. takes the value of either "0" or "1". However, it is well understood in the art that the same training algorithm can be applied to the case where the state of the visible neurons takes either integer or real values.

Training of an RBM involves using a set of K training vectors $x^k$, k=1, . . . , K each of which is the dimension of the set of visible neurons, to find the values of the weight and bias parameters of the RBM which maximise the probabilistic likelihood of the parameters given the training vectors.

To carry out the training algorithm, the values of the visible neurons are assigned the values of each of the training vectors in turn. For each training vector, or more usually after application of a batch of training vectors, the values of the weights and biases are changed according to some update rule. Typically, a very large set of training vectors is used, e.g. 60,000 training vectors for a widely-used benchmark training set known as the MNIST handwritten digits [3], and one sequence of applying the entire set of training vectors corresponds to what is called an epoch of the training algorithm.

The training process is then repeated for several such epochs, until the RBM is judged to have been trained to some satisfactory level. There are several measures of the training level, but most often this by means of testing the inference performance of the trained network on a validation set of vectors which are separate from but derived from the same source (in principle therefore come from the same probability distribution) as the training set.

In the following description of the preferred embodiment, we assume that the training vectors $x^k$, and the validation vectors, are binary-valued, i.e. each component $x_j^k$ of a training vector takes the value of either "1" or "0". However, neither the invention nor it described embodiment, is limited to the case of training a neural network with this restriction, and the training and validation vectors can take values other than binary, i.e. integer or real values.

2. The Standard Contrastive Divergence RBM Neural Network Training Algorithm.

The standard algorithm for training an RBM network is the Contrastive Divergence (CD) algorithm [2]. The algorithm caries out a sequence of steps to update the weights of the bidirectional connections and the biases of the neurons in the neural network, which are repeated for every vector in the training set. Completing the algorithm for one entire set of training vectors constitutes one epoch of training. The algorithm is then repeated using the same set of training vectors for a prespecified number of epochs.

3. Why the Standard Training Algorithm is not Suitable for Implementation on a Neuromorphic Computing System.

The implementation of a neural network training algorithm on a neuromorphic computing system is characterised by the following key features:

1. A neuromorphic computing system comprises a large number of processor cores, interconnected by a message passing communication network, and each neuron in the neural network is allocated to a particular processor core; several neurons, e.g. many hundreds, can be allocated to the same processor core.

2. For each neuron, the program code for computing the steps of the neural network training algorithm is stored and executed on the processor core to which the neuron is allocated. The weight and bias parameters associated with the neuron are stored locally to this processor core, either in the data tightly coupled memory (DTCM) of the core, or in a node-related random-access memory (RAM) which can be read from and written to from the core, normally using a direct memory access (DMA) process. There is no global memory in the system which is accessible to all the processor cores/nodes, and hence to all the neurons in the system.

3. Communication of data between the neurons is implemented by multicast message passing, allowing any neuron allocated to a core to send a message to any other neuron allocated to either the same or a different core in the computing system. Each message which is passed from one neuron (the source neuron) to any other neuron is a notification that the source neuron has fired a spike (see below for a definition of spike firing). The receipt of such a message by a neuron is referred to as the neuron receiving a spike. The transmission of real-valued weight or bias parameters is not possible using the communication network.

These characteristic features create a number of problems for the implementation of the standard CD training algorithm for an RBM neural network on a neuromorphic computing system, which the preferred embodiment of the neuromorphic RBM training algorithm described overcomes. These problems comprise:

1. Bidirectional vs. unidirectional network connections.

Figure 2:
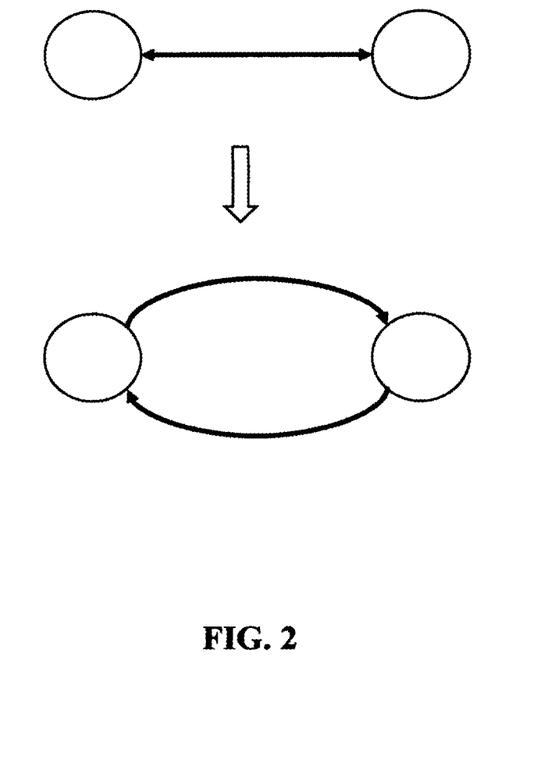
FIG. 2 illustrates how each bidirectional connection between two neurons in a Restricted Boltzmann Machine can be transformed into two unidirectional, recursive connections between the two neurons.

In the RBM neural network, the connections between visible and hidden neurons are bidirectional connections, and each connection is parameterised by a single weight value. This raises a problem for an implementation of the CD algorithm on a neuromorphic computing system since the connections between neurons when implemented on a neuromorphic computing system are unidirectional connections, i.e. from a source neuron to an arbitrary number of other receiving neurons. In the preferred embodiment, this problem is overcome by regarding each bidirectional connection between two neurons as two unidirectional connections between the neurons (FIG. 2). Each connection is then assigned its own weight, which is associated with the receiving neuron. Such weights are referred to as the synaptic weights of the receiving neuron.

2. Weight sharing

The solution to the problem of bidirectional connections and their single weight parameter, described above, in turn raises the problem of weight sharing, since the standard CD training algorithm requires that the same weight value, that of the bidirectional connection, is shared by both of the unidirectional connections. It follows that any change in this weight value, as a result of training, must be applied equally to both of the unidirectional connection weights. This implies the need for a method of sharing the weights, either via the communication networks or using shared memory. Since, in a neuromorphic system, communication between neurons is only for notification of spike firing, weight sharing cannot be implemented by communicating the weight value from one of the connected neurons to the other, using the communication network.

Also, since a neuromorphic computing system has no global memory, weight sharing between two unidirectional connections using the memory of the system can only be done by storing the shared weight in a local memory which is accessible to both of the connected neurons. Since all memory in a neuromorphic computing system is either core- or node-based, this implies that any two connected neurons must reside on the same core or node. In the case of an RBM neural network, where the visible and hidden neurons are fully connected, i.e. every neuron in one layer is connected to all the neurons in the other layer, this is clearly impractical, since it would restrict all the neurons in the neural network to be allocated to the same single core or node. This would remove ability to carry out parallel computation using the multiple cores and nodes of the system.

The following description of the preferred embodiment of the neuromorphic training algorithm illustrates how these problems are overcome by the invention.

Figure 3:
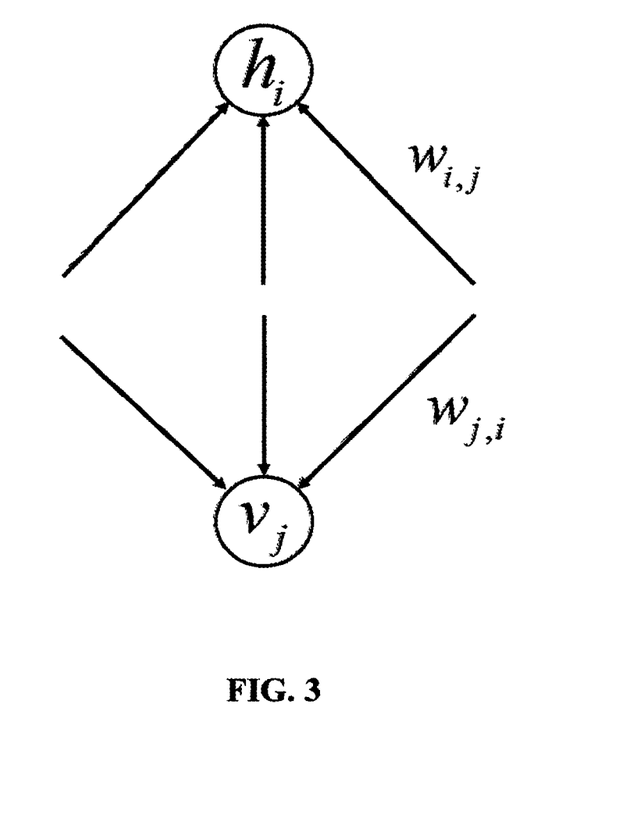
FIG. 3 illustrates how each hidden neuron $h_i$ which is connected to a visible neuron $v_j$ has associated with the connection a weight $w_{ij}$, and each visible neuron $v_j$ which is connected to a hidden neuron $h_i$ has associated with the connection a weight $w_{ji}$.

4. Description of the Preferred Embodiment of the Neuromorphic RBM Training Algorithm In the following description of preferred embodiment of the neuromorphic RBM training algorithm, the following definitions apply:

1. The connection made from the j th visible neuron to the i th hidden neuron is defined as the j th synapse of the i th hidden neuron, and $w_{i,j}$ as the synaptic weight of this connection. Likewise, the connection made from the i th hidden neuron to the j th visible neuron is defined as the i th synapse of the j th visible neuron, and $w_{j,i}$ as the synaptic weight of this connection (FIGS. 2 and 3).
2. The action of a neuro firing a spike is defined as taking place when a specified value reaches or exceeds a given threshold (see below). When a neuron fires a spike, a spike message is sent by the neuron, indicating this event to the all the neurons to which the neuron is connected. For clarity, it will be said simply that a neuron fires a spike, and that, in the receiving neuron, a synapse receives a spike.
3. At the time when the action is computed, if a neuron fires a spike, the state of the neuron is updated to take the value=1. If at that time the neuron does not fire a spike, then the state of the neuron takes the value=0.
4. The function σ(x) is defined as $$\sigma(x) = \frac{1}{1+\exp(-x)}$$

Start of Algorithm (for One Epoch of Training) (FIG. 4).

Denote the k th training rector by $x^k$, for k=1, ..., K, the number of training vectors, and set k=1.

Figure 4A:
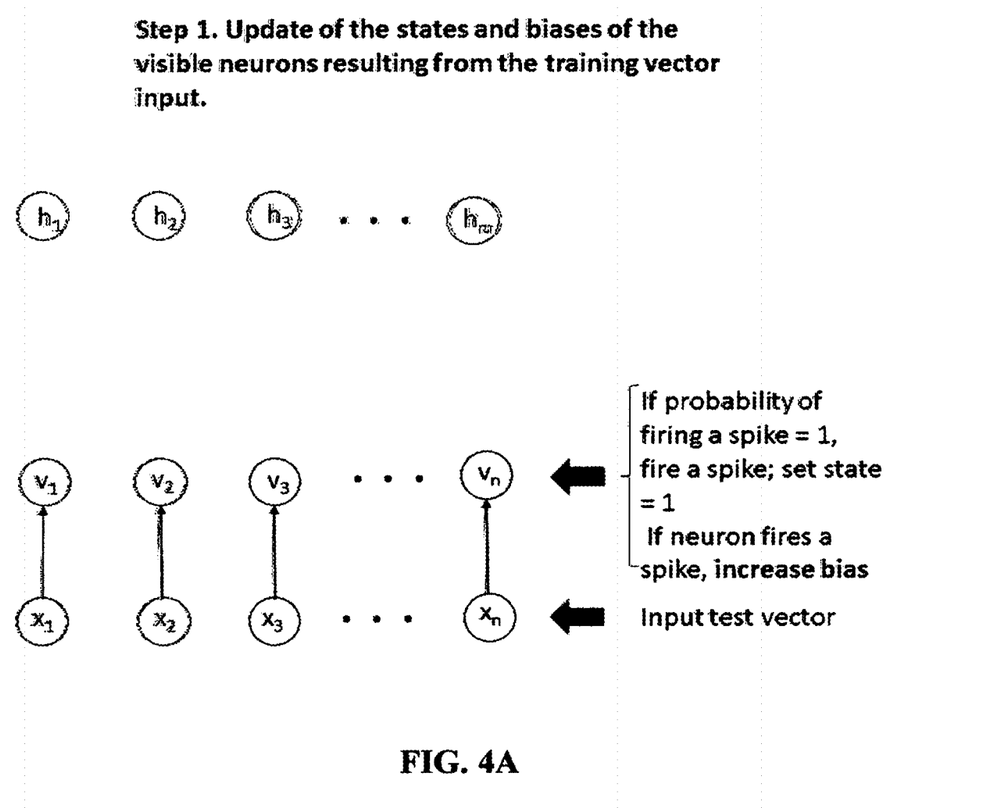

Step 1. Update of the States and Biases of the Visible Neurons Resulting from the Training Vector Input (FIG. 4a).

For each visible neuron $v_j$, j=1, ..., m,
(a) compute its probability of the neuron firing as $$p_j = x_j^k$$

(b) if $p_j=1$, fire a spike from the neuron.
(c) if the neuron fires, set the state of the neuron $v_j=1$; otherwise set $v_j=0$.
(d) increase the value of the bias of the neuron by:

$$b_j = b_j + \beta v_j$$

for a given small value β. Note that the neuron's bias will only change if the neuron fires.

Figure 4B:
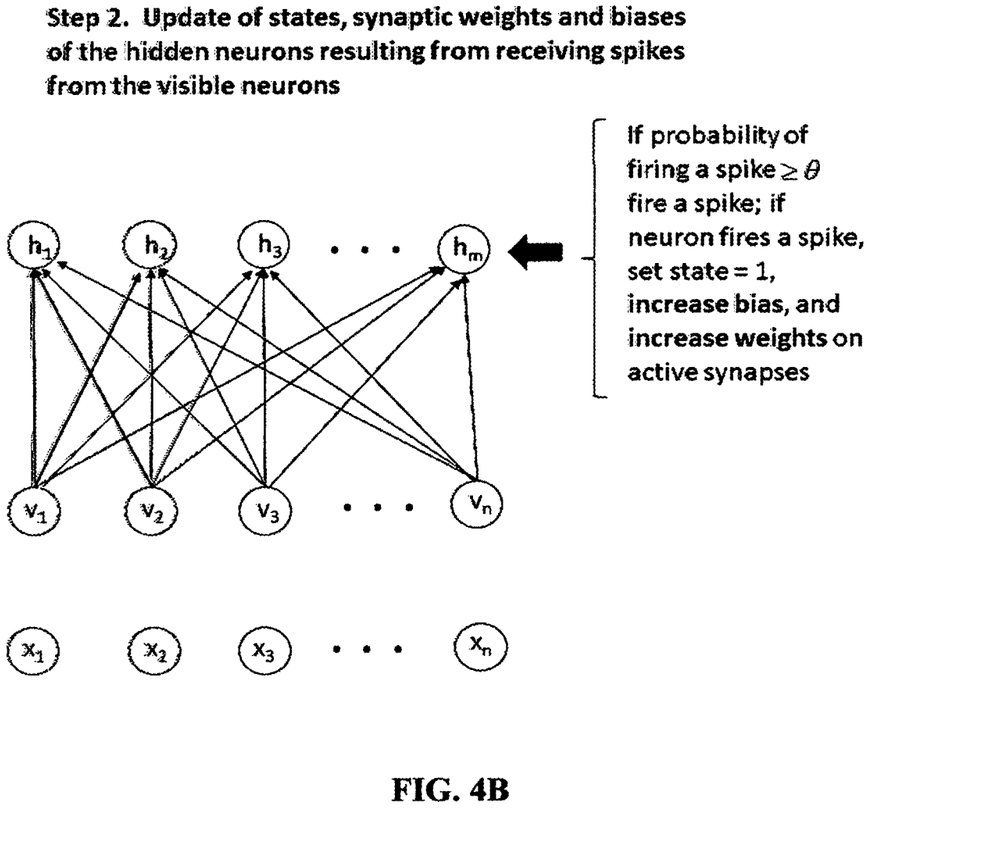

Step 2. Update of States, Synaptic Weights and Biases of the Hidden Neurons Resulting from Receiving Spikes from the Visible Neurons (FIG. 4b).

For each hidden neuron $h_i$, i=1, ..., m,
(a) compute the probability of the neuron firing as:

$$p_i = \sigma\left(a_i + \sum_{j=1}^{m} w_{i,j}\delta_j\right)$$

where $\delta_j=1$ if the j th synapse of the neuron received a spike; $\delta_j=0$ otherwise;
(b) generate a random number θ with a uniform distribution in the range from 0 to 1;
(c) if $p_i \geq \theta$, fire a spike from the neuron;
(d) if the neuron fires, set the state of the neuron $h_i=1$; otherwise set $h_i=0$;
(e) for j=1, ..., m, increase the j th synaptic weight $w_{i,j}$, and the bias $a_i$ of the neuron as:

$$w_{i,j} = w_{i,j} + \lambda h_i \delta_j$$

$$a_i = a_i + \beta h_i$$

for small values of β and λ. Note that the neuron's synaptic weights and bias will only change if the neuron fires, and only those synaptic weights will change where the synapse has received a spike which has contributed to this firing, i.e. where $\delta_j=1$.

Figure 4C:
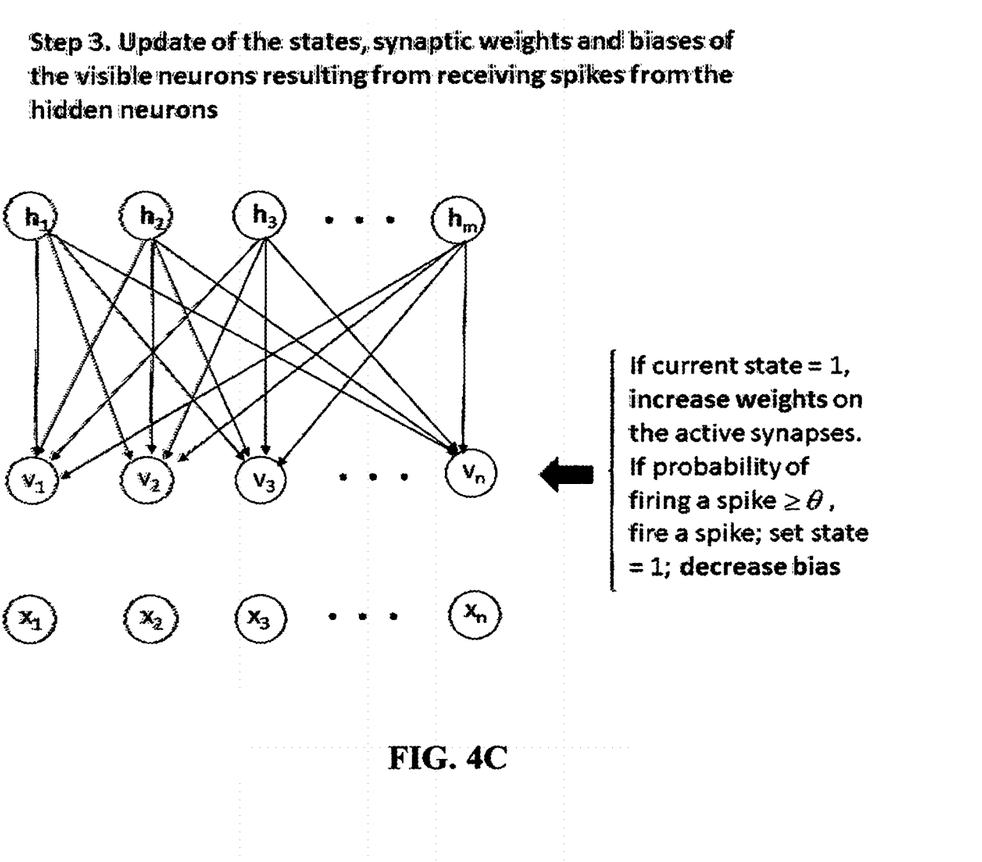

Step 3. Update of the States, Synaptic Weights and Biases of the Visible Neurons Resulting from Receiving Spikes from the Hidden Neurons (FIG. 4c).

For each visible neuron $v_j$, j=1, ..., n,
(a) for i=1, ..., m, if the neuron received a spike on its i th synapse, increase the synaptic weight as:

$$w_{j,i} = w_{j,i} + \lambda v_j \delta_i$$

where $v_j$ is the current state of the neuron; and $\delta_i=1$ if the i th synapse of the neuron received a spike; $\delta_i=0$ otherwise:
(b) for each visible neuron $v_j$, j=1, ..., m, compute its probability of the neuron firing a spike as $$p_j = \sigma\left(b_j + \sum_{i=1}^{n} w_{j,i}\delta_i\right)$$

where $\delta_i=1$ if the i th synapse of the neuron has received a spike; $\delta_i=0$ otherwise;
(c) generate a random number θ with a uniform distribution in the range from 0 to 1;

(d) if $p_j \geq 9$, fire a spike from the visible neuron $v_j$;
(e) if the neuron fires, set the state of the neuron $v_j=1$; otherwise set $v_j=0$;
(f) decrease the value of the bias of the visible neuron by:

$$b_j = b_j - \beta v_j$$

for a given small value $\beta$. Note that the neuron's bias will only change if the neuron fires.

Figure 4D:
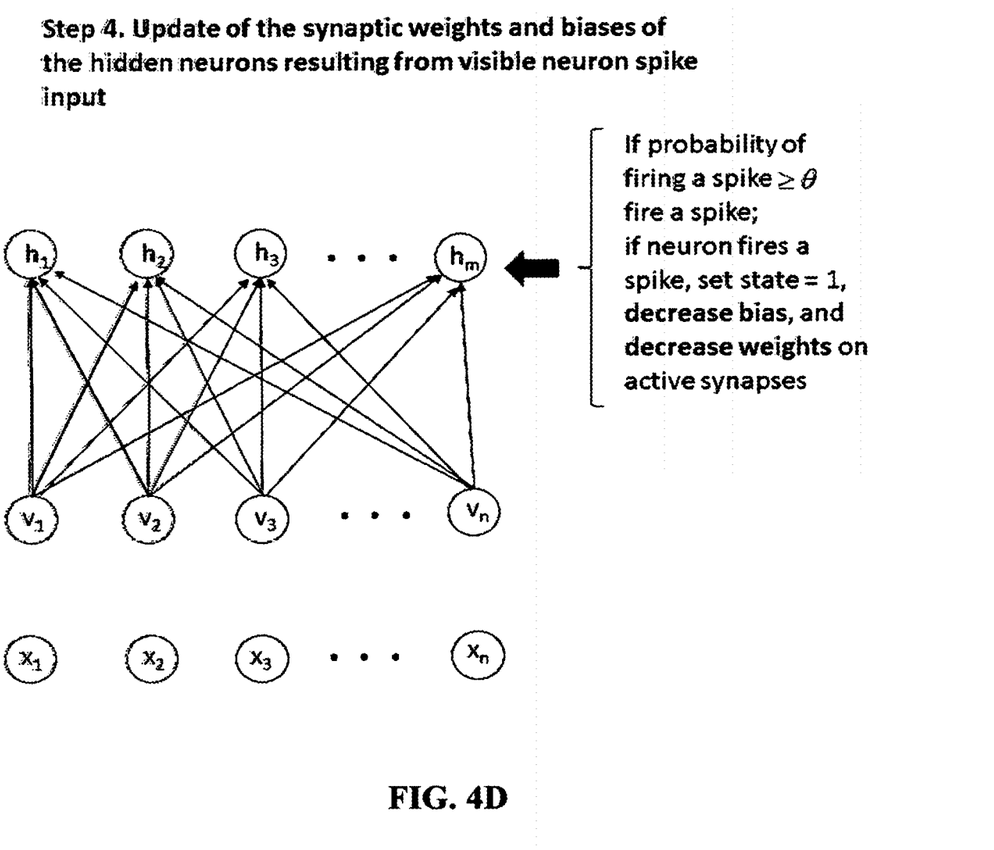

Step 4. Update of the Synaptic Weights and Biases of the Hidden Neurons Resulting from Visible Neuron Spike Input (FIG. 4d)

For each hidden neuron $h_i$, $i=1, \ldots, m$.
(a) compute the probability of firing of the neuron as:

$$p_i = \sigma\left(a_i + \sum_{j=1}^{m} w_{i,j}\delta_j\right)$$

where $\delta_j=1$ if the j th synapse of the neuron received a spike; $\delta_j=0$ otherwise,
(b) generate a random number $\theta$ with a uniform distribution in the range from 0 to 1;
(c) if $p_i \geq \theta$, fire a spike from the neuron;
(d) if the neuron fires, set the state of the neuron $h_i=1$; otherwise set $h_i=0$:
(e) for $j=1, \ldots, n$, decrease the j th synaptic weight $w_{i,j}$ and the bias $a_i$ of the neuron as:

$$w_{i,j} = w_{i,j} - \lambda h_i \delta_j$$

$$a_i = a_i - \beta h_i$$

for small values of $\beta$ and $\lambda$. Note that the neuron's synaptic weights and bias will only change if the neuron fires, and only those synaptic weights will change where the synapse has received a spike which has contributed to this firing, i.e. where $\delta_j=1$.

Figure 4E:
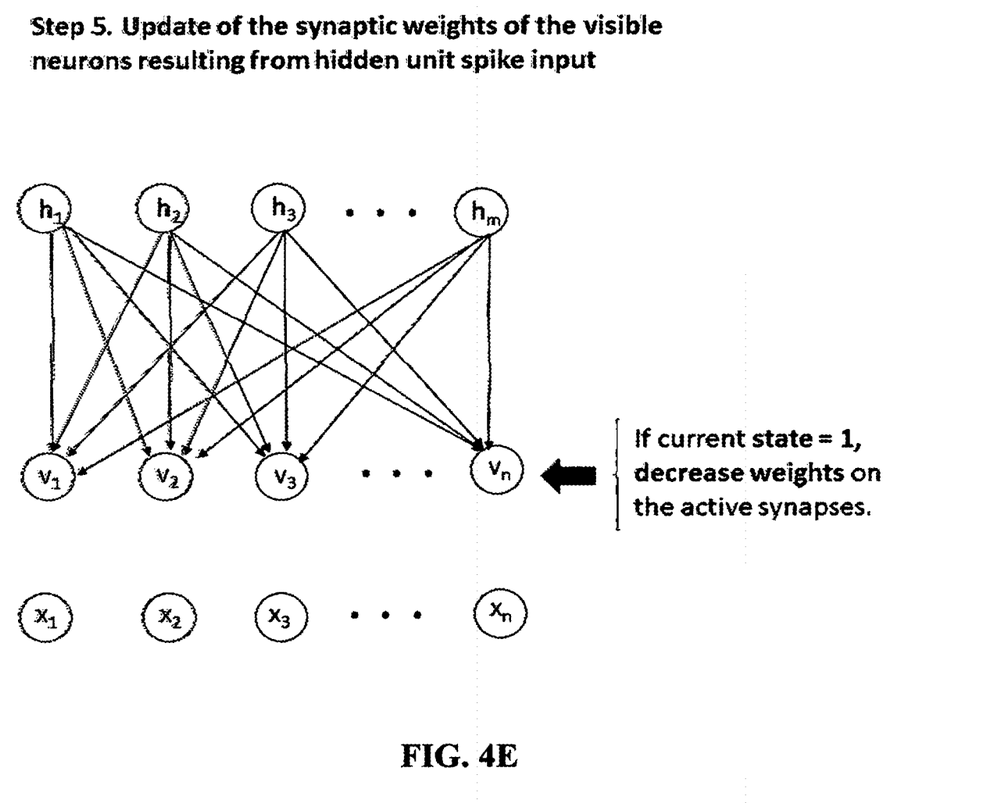

Step 5. Update of the Synaptic Weights of the Visible Neurons Resulting from Hidden Unit Spike Input (FIG. 4e).

For each visible neuron $v_j$, $j=1, \ldots, n$,
(a) for $i=1, \ldots, m$, if the neuron received a spike on its i th synapse, decrease the synaptic weight as:

$$w_{j,i} = w_{j,i} - \lambda v_j \delta_i$$

where $v_j$ is the current state of the neuron, and $\delta_i=1$ if the i th synapse of the neuron received a spike; $\delta_i=0$ otherwise.

Stopping Condition
If $k \neq K$, set $k=k+1$ and go to Step 1; otherwise stop.
End of Algorithm Description.

5. Properties of the Neuromorphic Training Algorithm
The neuromorphic training algorithm has the following properties:
1. Local storage of neuron weights and biases
   Each visible and hidden neuron stores its individual bias and weights in memory which is local to the neuron, and, as a result, no communication of weights, or shared access to stored weights in memory, is required, and hence no constraints are placed on how the neurons are distributed across the cores/nodes of the neuromorphic computer.
2. Local asynchronous, event-based update of neuron weights and biases
   In both the positive and negative phases, each neuron, in both the visible and hidden layers, updates its weights and bias autonomously and asynchronously, and immediately on receipt of a spike or combination of spikes at its synaptic inputs
3. Weight updates are based on the timing of the firing of the neuron and whether the weights are being increased (positive phase) or decreased (negative phase) as follows:
   Hidden neurons:
   a. positive phase: if the i th hidden neuron receives a synaptic input spike from the j th visible neuron which contributes to the hidden neuron subsequently firing a spike, the synaptic weight $w_{i,j}$ is increased.
   b. negative phase: if the i th hidden neuron receives a synaptic input spike from the j th visible neuron which contributes to the neuron subsequently firing a spike, the synaptic weight $w_{i,j}$ is decreased
   Visible neurons:
   a. positive phase: if the j th visible neuron receives a synaptic input spike from the i th hidden neuron and the visible neuron fired a spike at its last state update, i.e. the state of the neuron=1, the synaptic weight $w_{j,i}$ is increased.
   b. negative phase: if the j th visible neuron receives a synaptic input spike from the i th hidden neuron and the visible neuron fired a spike at its last state update, i.e. the state of the neuron=1, the synaptic weight $w_{j,i}$ is decreased
4. Bias updates depend on the neuron firing a spike. If a visible or hidden neuron fires a spike the neuron's bias is incremented in the positive phase or decremented in the negative phase.

By employing the properties described above, there is no requirement for the communication of weights between neurons, or shared access to stored weights in memory, is required, and hence no constraints are placed on how the neurons are distributed across the cores/nodes of the neuromorphic computer, thus providing a training algorithm which can be implemented efficiently on a neuromorphic computer system.

CONCLUSION

The disclosed embodiment, described above, is illustrative, not restrictive. While a specific configuration of the neuromorphic RBM training algorithm has been described, it is understood that the present invention can be applied to the training of a wide variety of neural networks, including those which fall into the general category of Markov Random Fields. There are many alternative ways of implementing the invention

REFERENCES

[1] Furber, S. B., et al. (2013) "*Overview of the SpiNNaker system architecture*" IEEE Transactions on Computers, 62 (12): 2454-2467.
[2] Hinton, G. E. (2002). "*Training Products of Experts by Minimizing Contrastive Divergence*", Neural Computation 14 (8): 1771-1800.
[3] http://yann.lecun.com/exdb/mnist/

What is claimed is:
1. A neural network system implemented using a neuromorphic computer architecture comprising:
   a plurality of distributed processing units;
   a communication network configured to enable communication between the plurality of distributed processing units; and
   a distributed memory comprising a plurality of memory units, wherein each respective memory unit is local to and accessible by only a subset of the distributed processing units;

wherein each distributed processing unit is configured to wake from a sleep state responsive to receiving a signal via the communication network from an originating distributed processing unit of the plurality of processing units, and to process the signal and to return to the sleep state upon completion of the processing;

wherein the received signal comprises an identity of the originating distributed processing unit and routing data;

wherein the neural network system is configured to implement a Restricted Boltzmann Machine-type neural network comprising a visible layer of neurons connected to a hidden layer of neurons through a plurality of weighted bidirectional connections, the implementing comprising:

allocating each neuron of the visible layer and each neuron of the hidden layer to one of the plurality of distributed processing units; and converting each respective weighted bidirectional connection to two independently weighted unidirectional connections comprising a visible neuron to hidden neuron connection and a hidden neuron to visible neuron connection corresponding to the visible and hidden neurons connected by the bidirectional connection;

wherein the respective weight value of a visible neuron to hidden neuron connection is stored in the memory unit accessible by the distributed processing unit allocated to the hidden neuron; and wherein the respective weight value of a hidden neuron to visible neuron connection is stored in the memory unit accessible by the distributed processing unit allocated to the visible neuron.

2. The neural network system of claim 1, wherein a distributed processing unit that has been allocated a hidden neuron is configured to:

process a received signal indicating that a visible neuron connected to the hidden neuron has fired an output spike and the weight value for the corresponding visible neuron to hidden neuron unidirectional connection to generate an output spike for the hidden neuron; and update the weight value for the corresponding visible neuron to hidden neuron unidirectional connection based upon the received signal and the generated output spike for the hidden neuron.

3. The neural network system of claim 2, wherein updating the weight value for the corresponding visible neuron to hidden neuron unidirectional connection based upon the received signal and the generated output spike for the hidden neuron comprises increasing the weight value when the hidden neuron is in a positive phase.

4. The neural network system of claim 2, wherein updating the weight value for the corresponding visible neuron to hidden neuron unidirectional connection based upon the received signal and the generated output spike for the hidden neuron comprises decreasing the weight value when the hidden neuron is in a negative phase.

5. The neural network system of claim 1, wherein a distributed processing unit that has been allocated a visible neuron is configured to:

receive a signal indicating that a hidden neuron connected to the visible neuron has fired an output spike; and update the weight value for the corresponding hidden neuron to visible neuron unidirectional connection based upon the received signal and a current state of the visible neuron.

6. The neural network system of claim 5, wherein the distributed processing unit that has been allocated the visible neuron is further configured to:

subsequent to updating the weight value for the corresponding hidden neuron to visible neuron unidirectional connection, process the updated weight value and the received signal to determine whether to generate an output spike for the visible neuron;

responsive to determining that an output spike is to be generated, generate the output spike for the visible neuron; and update the state of the visible neuron based upon whether an output spike was generated.

7. The neural network system of claim 5, wherein updating the weight value for the corresponding hidden neuron to visible neuron unidirectional connection based upon the received signal and a current state of the visible neuron comprises increasing the weight value when the visible neuron is in a positive phase.

8. The neural network system of claim 5, wherein updating the weight value for the corresponding hidden neuron to visible neuron unidirectional connection based upon the received signal and a current state of the visible neuron comprises decreasing the weight value when the visible neuron is in a negative phase.

9. The neural network system of claim 1, wherein a distributed processing unit that has been allocated a visible neuron is configured to:

process a portion of a data item to determine whether to generate an output spike for the visible neuron;

responsive to determining that an output spike is to be generated, generate the output spike for the visible neuron; and update the state of the visible neuron based upon whether an output spike was generated.

\* \* \* \* \*